United States Patent [19]

Ishigami

[11] Patent Number: 5,345,307
[45] Date of Patent: Sep. 6, 1994

[54] LINEAR PHASE RAMP TYPE FIBER OPTIC GYRO HAVING RAMP RESET AND RESET CONNECTION SIGNALS

[75] Inventor: Motohiro Ishigami, Tokyo, Japan

[73] Assignee: Japan Aviation Electronics Industry Limited, Tokyo, Japan

[21] Appl. No.: 840,833

[22] Filed: Feb. 25, 1992

[30] Foreign Application Priority Data

Feb. 27, 1991 [JP] Japan .................................. 3-033168

[51] Int. Cl.$^5$ ............................................. G01C 19/72
[52] U.S. Cl. .................................................. 356/350
[58] Field of Search ........................................ 356/350

[56] References Cited

U.S. PATENT DOCUMENTS

| | | | |
|---|---|---|---|
| 4,705,399 | 11/1987 | Graindorge et al. | 356/350 |
| 5,031,988 | 7/1991 | Okada | 356/350 |
| 5,166,750 | 11/1992 | Ishigami | 356/350 |

FOREIGN PATENT DOCUMENTS

| | | |
|---|---|---|
| 0168292 | 1/1986 | European Pat. Off. . |
| 0245118 | 11/1987 | European Pat. Off. . |
| 0418539 | 3/1991 | European Pat. Off. . |

Primary Examiner—Samuel A. Turner
Attorney, Agent, or Firm—Pollock, Vande Sande & Priddy

[57] ABSTRACT

The output of a synchronous detector for interference light is applied to a low-pass filter of a high cut-off frequency and a low-pass filter of a low cut-off frequency, and their outputs are compared by a comparator. When a phase cancel ramp signal by a phase cancel signal generator has reached a positive or negative threshold voltage, a reset signal generator generates a reset signal and a reset sign signal which represents at which of the positive and negative threshold voltages the reset is caused. Based on these signals, an up-down control circuit controls a counter to perform the count-up or count-down operation. The counter counts the reset signal from the reset signal generator and the count value of the counter is converted by a D/A converter to an analog correcting value. The correcting value is added by an adder to a reference level from a reference level generator. The added value is used as a positive threshold voltage $V_{CP}$ and the voltage $V_{CP}$ is polarity inverted by an inverter and the inverted output is used as the negative threshold voltage $V_{CN}$.

5 Claims, 11 Drawing Sheets

LINEAR PHASE RAMP TYPE FIBER OPTIC GYRO HAVING RAMP RESET AND RESET CONNECTION SIGNALS

BACKGROUND OF THE INVENTION

Figure 1:
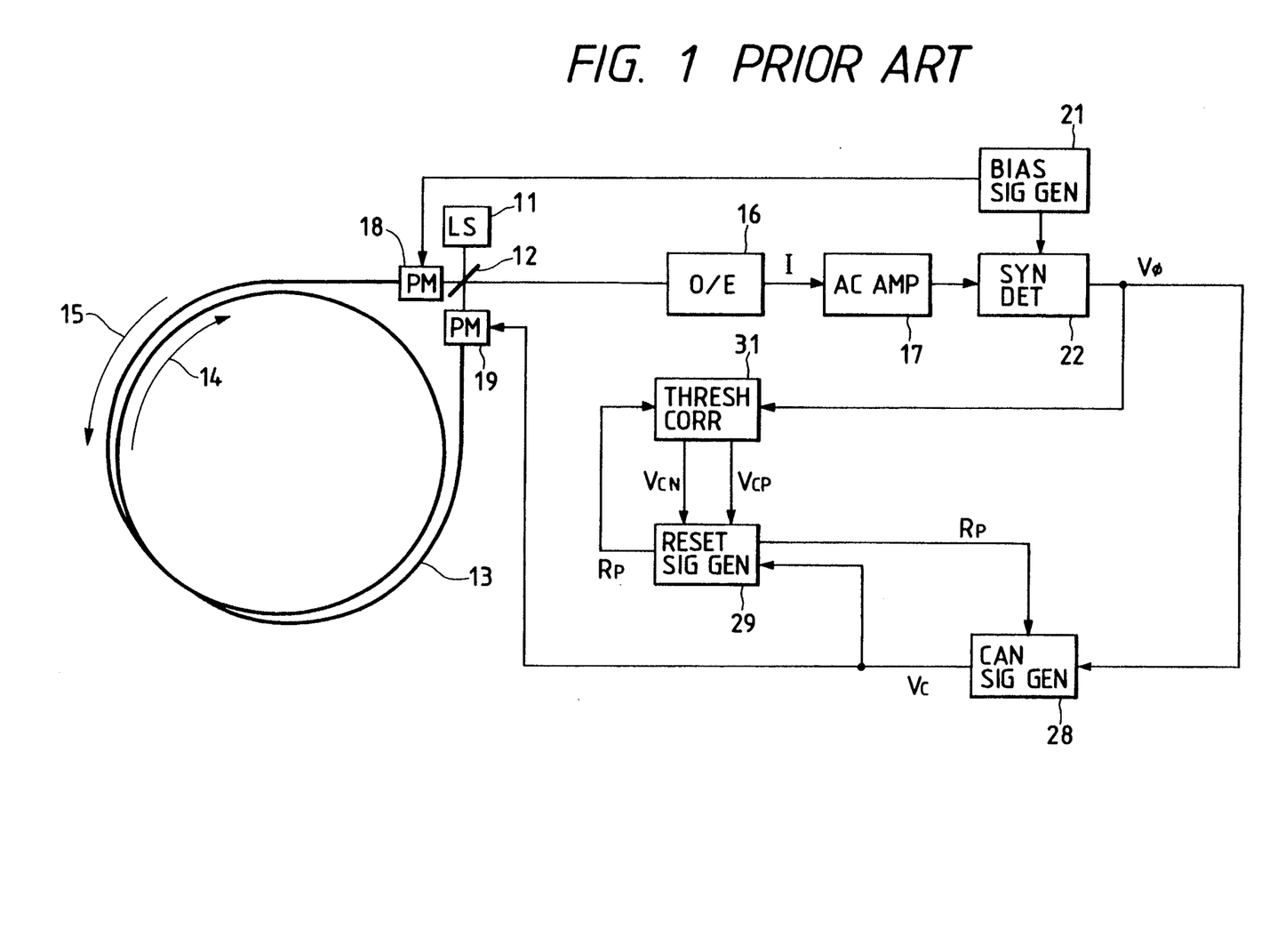
FIG. 1 is a block diagram showing a conventional linear phase ramp type fiber optic gyro.

The present invention relates to a linear phase ramp type fiber optic gyro having a looped optical transmission line through which clockwise and counterclockwise light beams are propagated, in which there are generated a ramp signal for providing to the clockwise and counterclockwise light beams a saw-tooth ramp phase of such a slope as to cancel a phase difference between the two light beams produced by an angular velocity inputted to the looped optical transmission line and a biasing signal for alternately giving phase differences of $+\pi/2$ rad and $-\pi/2$ rad between the two light beams emitted from the looped optical transmission line whereby the inputted angular velocity is found from FIG. 1 shows the basic construction of a conventional linear phase ramp type fiber optic gyro disclosed in U.S. Pat. No. 5,031,988, for instance. A light beam from a light source 11 such as a laser is split by beam splitter 12 into two light beams, which enter, as a clockwise light beam 14 and a counterclockwise light beam 15, into a looped optical transmission line 13 formed by, for example, a polarization preserving optical fiber-coil, at opposite ends. The two light beams 14 and 15 having propagated through the optical transmission line 13 in opposite directions and emitted therefrom are coupled together again by the beam splitter 12 and interfere with each other. The resulting interference light is converted by a photoelectric or transducer 16 into an electric signal corresponding to the intensity of the interference light. The AC component of the electric signal is amplified and the DC component of the signal is cut off, by an AC amplifier 17. Interposed between the beam splitter 12 and the two ends of the optical transmission line 13 are first and second optical phase modulators 18 and 19. A biasing signal generator 21 generates a rectangular digital biasing signal $V_B$ of a period $2\tau$ and a duty ratio 50% by which the phase difference produced between the light beams 14 and 15 at the time when they have interfered with each other becomes alternately $+\pi/2$ rad and $-\pi/2$ rad at intervals of $\tau$ where t is the duration that the light from the light source 11 takes to propagate through the optical transmission line 13. The biasing signal $V_B$ is applied as a modulation signal to the first optical phase modulator 18. In synchronism with this phase shift and consequently the biasing signal $V_B$ the output of the AC amplifier 17 is synchronously detected by a synchronous detector 22 at intervals of $\tau$.

Figure 2:
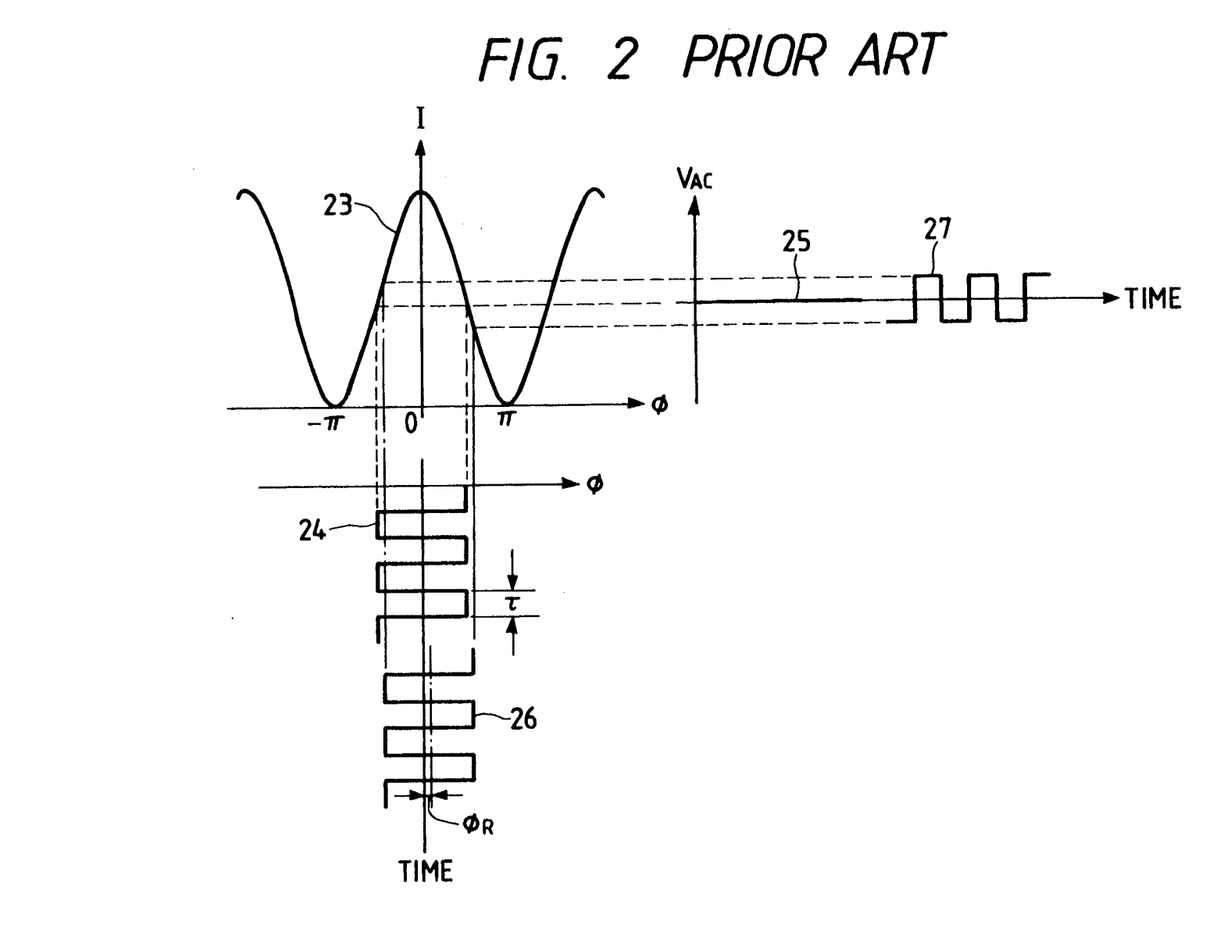
FIG. 2 is a graph showing an example of the output characteristic of an optoelectric transducer 16 with respect to the phase difference $\Phi$ between clockwise and counterclockwise light beams.

The phase difference $\Phi$ between the clockwise and counterclockwise light beams 14 and 15 when they interfere after being emitted from the optical transmission line 13 and the output I of the AC amplifier 17 bear such a relationship as indicated by the curve 23 in FIG. 2. When the phase difference $\Phi$ is $\pm 2\pi k$ rad (k being an integer equal to or greater than 0) the two light beams 14 and 15 intensify each other and the intensity of the interference light is maximum, and when the phase difference $\Phi$ is $\pm(2k+1)\pi$ rad they cancel each other and the intensity of the interference light is minimum. When no angular velocity is being input or applied to the optical transmission line 13, the phase difference $\Phi$ between the clockwise and counterclockwise light beams 14 and 15 alternately changes, with the modulation by the first optical phase modulator 18, positively and negatively by the same value about zero phase as its center of variation at intervals of $\tau$ as indicated by the curve 24 in FIG. 2. In this instance, the output $V_{AC}$ of the AC amplifier 17 becomes constant as indicated by the line 25 and the output $V\Phi$ of the synchronous detector 22 is zero. When an angular velocity is applied to the optical transmission line 13, a phase difference (a Sagnac shift) $\Phi_R$ develops, owing to the Sagnac effect, between the clockwise and counterclockwise light beams 14 and 15 in accordance with the direction and magnitude of the input angular velocity. Under the influence of the phase difference $\Phi_R$ the phase difference $\Phi$ between the clockwise and counterclockwise light beams 14 and 15 goes positive and negative alternately by the same value about a phase shifted from the zero phase by $\Phi_R$ at its center of variation at intervals of the time $\tau$ as indicated by the curve 26 in FIG. 2. In consequence, the output $V_{AC}$ of the AC amplifier 17 alternately goes to positive and negative levels corresponding to the phase difference $\Phi_R$ at $\tau$ time intervals as indicated by the curve 27, and in this case the output $V_{AC}$ is either in-phase or 180° out-of-phase with the biasing signal $V_B$ from the biasing signal generator 21. The output level $V\Phi$ corresponding to the phase difference $\Phi_R$ can be obtained by multiplying the output $V_{AC}$ of the AC amplifier 17 by $+1$ and $-1$, in synchronism with the biasing signal $V_B$ in the synchronous detector 22.

Figure 3A:
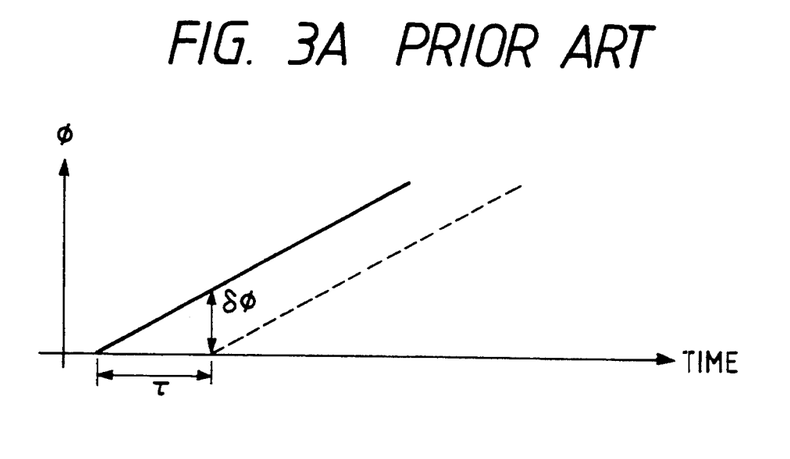
FIG. 3A is a graph showing the relationship between a phase shift of the clockwise light beam by a phase cancel ramp signal and a phase shift of the counterclockwise light beam by the phase cancel ramp signal.
Figure 3B:
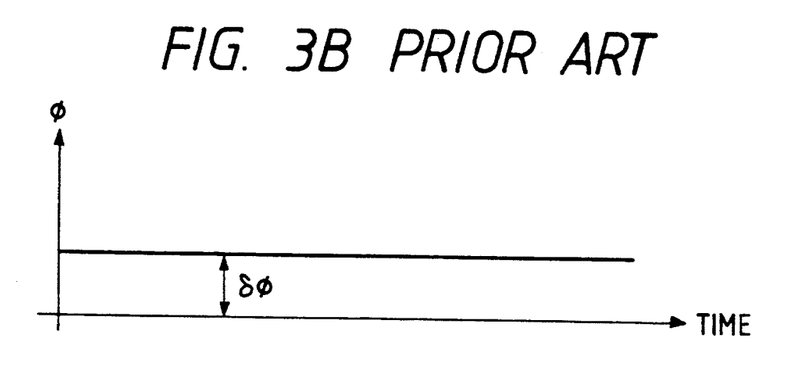
FIG. 3B is a graph showing the phase difference between the two light beams caused by the phase cancel ramp signal.
Figure 3C:
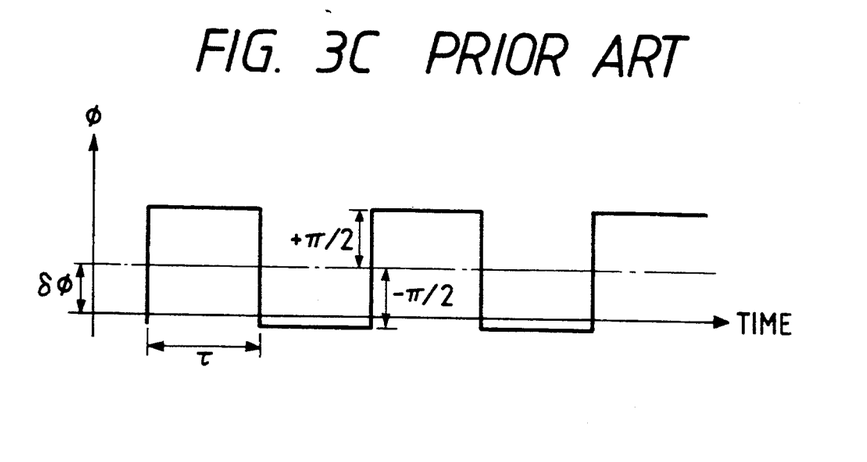
FIG. 3C is a graph showing the overall phase difference between the two light beams.

Based on the thus obtained detected output $V\Phi$ of the synchronous detector 22, a phase cancel signal generator 28 generates a negative feedback signal (a phase cancel ramp signal) $V_c$ which reduces the output $V\Phi$ to zero. The phase cancel ramp signal $V_c$ has a slope corresponding to the detected level of the synchronous detector 22 and is applied as a modulation signal to the second optical phase modulator 19. The clockwise light beam 14 reaching the beam splitter 12 after being emitted from the optical transmission line 13 is subjected to such a phase shift as indicated by the solid line in FIG. 3A, whereas the counterclockwise light beam 15 is subject to such a phase shift as indicated by the broken line in FIG. 3A with a delay of the propagation time $\tau$. Consequently, the phase difference between the two light beams 14 and 15 in the beam splitter 12, caused by the phase modulation by the second optical phase modulator 19, is equal to a phase variation $\delta\Phi$ per time $\tau$ on the basis of the phase cancel ramp signal $V_C$. Since the phase cancel ramp signal $V_C$ cannot be increased infinitely, however, a ramp waveform is used as the phase cancel ramp signal Vc, which repeatedly increases from zero to a shift setting voltage $+Vs$ which provides a phase shift of $2m\pi$ (m is an integer equal to or grater than 1). This ramp waveform can easily be generated by producing a reset signal $R_p$ from a reset signal generator 29 to reset the phase cancel signal generator 28 each time when the phase cancel ramp signal $V_c$ reaches the shift setting voltage $+Vs$ as described later. Similarly, when the slope of the phase cancel ramp signal $V_C$ is negative, a ramp waveform is used as the phase cancel ramp signal Vc, which is repeatedly reset to zero each time when the phase cancel ramp signl Vc reaches a shift setting voltage $-Vs$ providing a phase shift $-2m\pi$. The overall phase difference between the emitted light beams 14 and 15 in the beam splitter 12, as added to the phase modulation by the biasing signal $V_B$, is such as shown in FIG. 3C. Hence, by controlling the phase variation $\delta\Phi$ per time $\tau$ based on the phase cancel ramp signal $V_C$ so that the output $V\Phi$ of the synchronous detector 22 is reduced to zero, the phase variation $\delta\Phi$ becomes equal to the Sagnac phase difference $\Phi_R$ caused by the input angular velocity $\Omega$.

The relationship between the input angular velocity and the Sagnac phase difference $\Phi_R$ is expressed by the following equation:

$$\Phi_R = 4\pi RL\Omega/(\lambda C) \quad (1)$$

where R is the radius of the optical transmission line 13, L the length of the optical transmission line (i.e. an optical fiber) 13, $\lambda$ is the wavelength of light emitted from the light source 11, C is the velocity of light in a vacuum and $\Omega$ is the input angular velocity. Then, the input angular velocity is expressed by $$\Omega = \lambda C \delta\Phi/(4\pi RL). \quad (2)$$

The input angular velocity $\Omega$ and the phase variation $\delta\Phi$ per time $\tau$ based on the phase cancel ramp signal $V_C$ bear a linear relationship.

As disclosed in the aforementioned U.S. patent when the phase cancel ramp signal $V_C$ from the phase cancel signal generator 28 has reached the predetermined shift setting voltage $\pm V_s$ corresponding to $\pm 2m\pi$ rad, the reset signal generator 29 generates a reset signal for resetting the phase cancel signal generator 28. In other words, the phase cancel ramp signal $V_C$ becomes a sawtooth signal. Hence, given that the time interval between a resetting and the subsequent resetting immediately thereof is T, the next equation (3) is effected $$\delta\Phi = 2m\pi\tau/T = 2m\pi\tau f \quad (3)$$

because of the following relationship:

$$T \cdot \delta\Phi/\tau = 2m\pi.$$

Substitution of Eq. (3) into Eq. (2) gives $$\Omega = \lambda C m\tau f/(2RL) \quad (4)$$

Since $\tau = nL/C$ (where n is the refractive index of the optical transmission line (i.e. the optical fiber) 13), its substitution into Eq. (4) gives $$\Omega = \lambda nmf/(2R) \quad (5)$$

Thus, the input angular velocity $\Omega$ can be obtained by measuring the frequency f of the phase cancel ramp signal $V_C$.

Figure 4:
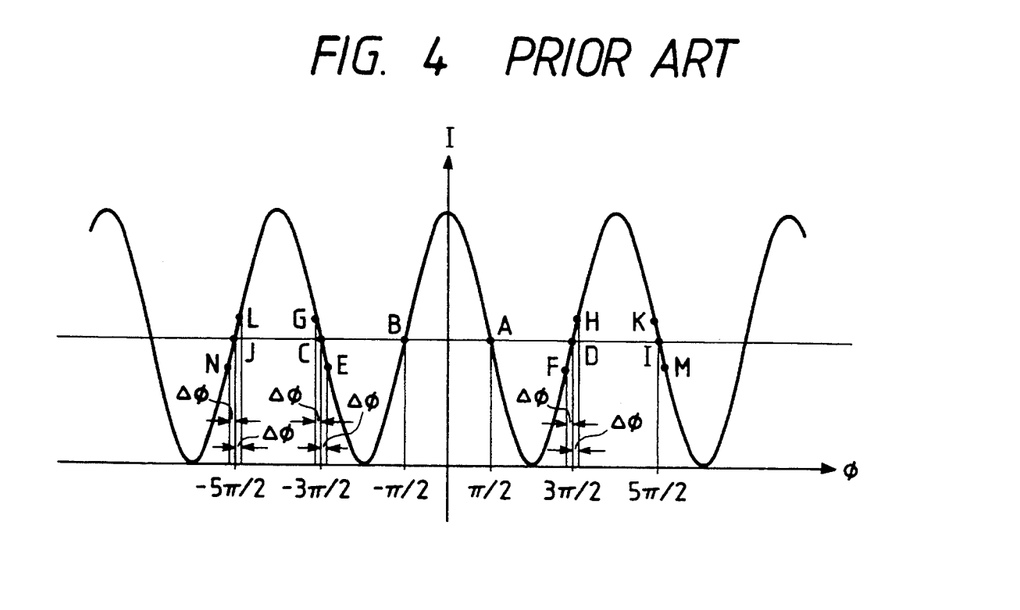
FIG. 4 is a graph showing the phase difference $\Phi$ between the two light beams and the positions of interference fringes which are observed in the optoelectric transducer 16.

When the phase difference provided between the clockwise and counterclockwise light beams 14 and 15 by the phase cancel ramp signal $V_C$ is $\delta\Phi$, the intensity I of the interference light which is observed in the optoelectric transducer 16 is the light intensity at points A and B in FIG. 4, since the phase difference $\delta\Phi$ is cancelled by the Sagnac shift phase $\Phi_R$ via the negative feedback loop. The phase difference between the two light beams in the beam splitter 12 when the phase cancel ramp signal $V_C$ is reset is $\pm(2m\pi\pm\pi/2) + \delta\Phi$. Since the term of the phase difference $\delta\Phi$ is cancelled by the Sagnac shift $\Phi_R$ through the negative feedback loop, the intensity I of the interference light which is observed in the optoelectric transducer 16 becomes equal to the intensity at points where the phase difference is $\pm(2m\pi\pm\pi/2)$ rad in FIG. 4, for example, at points C and J or D and I when m=1. That is, when the negative feedback loop is stable, the intensity of the interference light observed in the optoelectric transducer 16 is always constant.

In practice, however, it is difficult to make the threshold voltages $+V_{CP}$ and $-V_{CN}$ in complete coincidence with the shift setting voltage $+V_S$ and $-V_S$ so that the phase cancel ramp signal $V_C$ is reset when it has reached the shift setting voltages $\pm V_S$ which provide the phase shifts $\pm 2m\pi$ rad in the second optical phase modulator 19. Furthermore, since the conversion gain of the second optical phase modulator 19 varies with surrounding conditions such as temperature, the values of the shift setting voltages $\pm V_S$. The relative deviation of the positive and negative threshold voltages $V_{CP}$ and $V_{CN}$ from the phase shift amounts $\pm 2m\pi$ in the optical phase modulator 19 is equivalent to the variation of the value m, hence the input angular velocity $\Omega$ cannot correctly be measured, as will be seen from Eq. (5), for example.

Figure 5A:
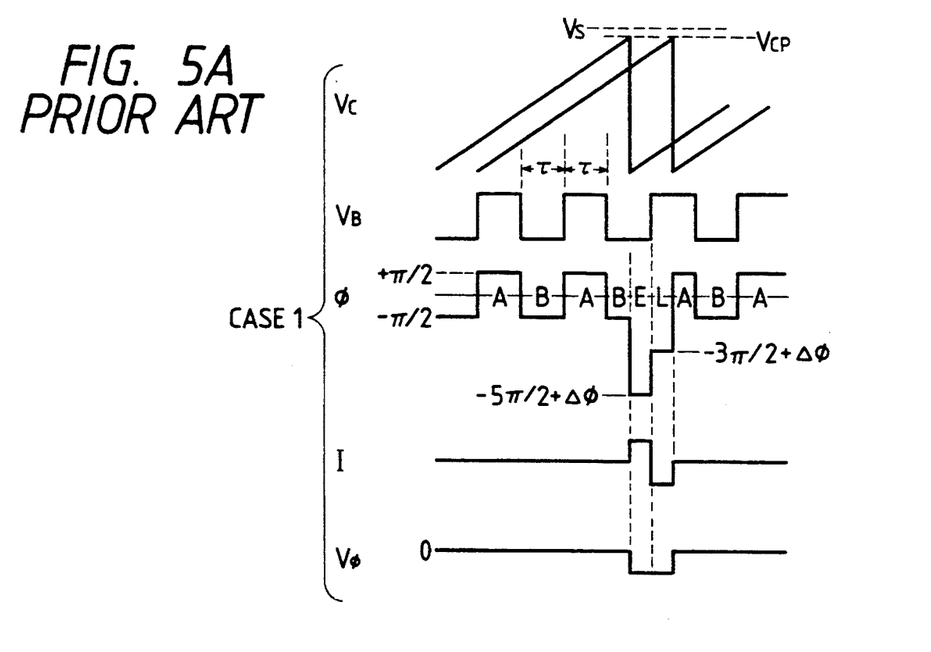
FIG. 5A is a diagram showing the phase cancel ramp signal, the biasing signal, the overall phase difference, the intensity of interference light and the synchronous detector output in Case 1 described later in Preferred Embodiment of the Invention.

Now, consider the case where the phase cancel ramp signal $V_C$ has a positive-going slope as shown in FIG. 5A and the conversion gain of the second optical phase modulator 19 is smaller than the initialized value, that is, the case where the shift setting voltage $+V_S$ necessary for providing the phase shift $2\pi m$ is higher than the threshold voltage $V_{CP}$ and the phase cancel ramp signal $V_C$ is reset before reaching the shift setting voltage $V_S$ (Case 1). In the state where the phase difference $\delta\Phi$ is cancelled by the Sagnac phase shift $\Phi_{R'}$ the phase difference $\Phi$ between the two light beams at the time of resetting is smaller in absolute value than $-(2m\pi\pm\pi/2)$ rad (the case of m=1 being shown) by $\Delta\Phi$. Consequently, the intensity I of the interference light which is observed in the optoelectric transducer 16 at the time of resetting is equal to the intensity at points E and L in FIG. 4, and the output resulting from the synchronous detection of the intensity of the interference light becomes smaller than the synchronous detected output at each of points A and B in FIG. 5A (Case 1).

Figure 5B:
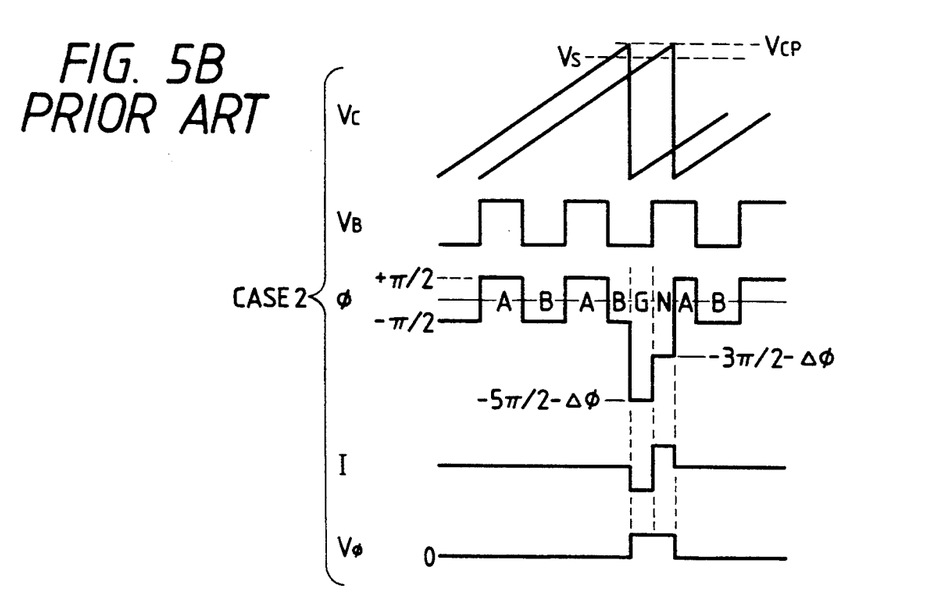
FIG. 5B is a diagram showing the phase cancel ramp signal, the biasing signal, the overall phase difference, the intensity of interference light and the synchronous detector output in Case 2 described later in Preferred Embodiment of the Invention.

Now, consider the case where the phase cancel ramp signal $V_C$ has a positive-going slope, the conversion gain of the optical phase modulator 19 is larger than the initialized value and consequently the shift setting voltage $+V_S$ necessary for providing the phase shift $2\pi m$ decreases and the threshold voltage $V_{CP}$ exceeds the shift setting voltage $V_S$, as shown in FIG. 5B (Case 2). In this instance with the phase difference $\delta\Phi$ having been cancelled by the Sagnac phase shift $\Phi_{R'}$ the phase difference $\Phi$ between the two light beams at the time of resetting is larger in absolute value than $-(2m\pi\pm\pi/2)$ rad by $\Delta\Phi$. Hence the intensity I of the interference light which is observed in the optoelectric transducer 16 is equal to the intensity at points G and N in FIG. 4, and the output $V\Phi$ resulting from the synchronous detection of the intensity I of the interference light is larger than the synchronously detected output $V\Phi$ at each of the points A and B.

Figure 5C:
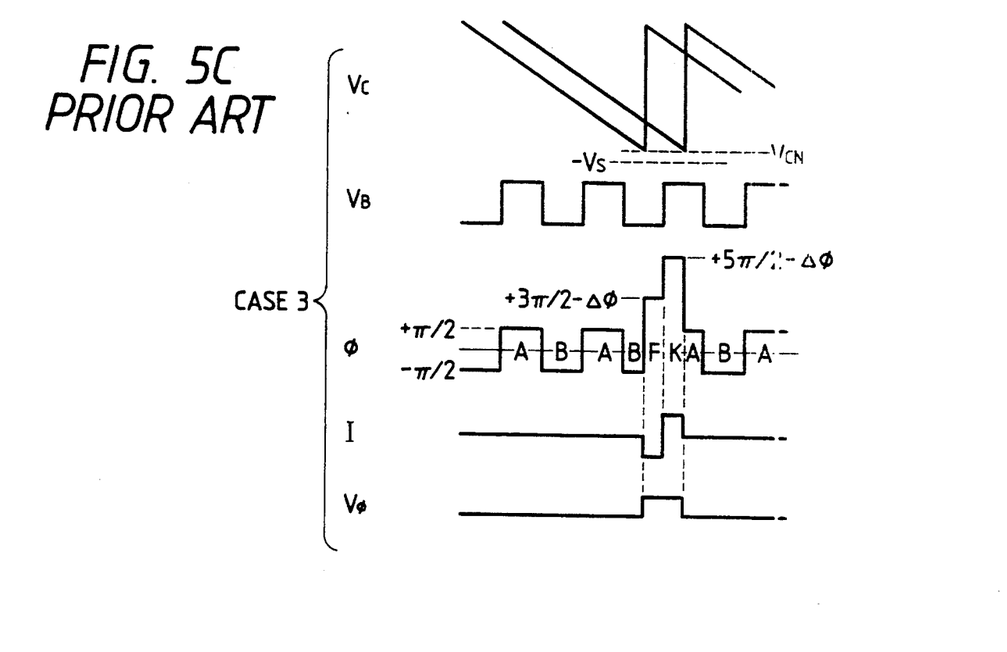
FIG. 5C is a diagram showing the phase cancel ramp signal, the biasing signal, the overall phase difference, the intensity of interference light and the synchronous detector output in Case 3 described later in Preferred Embodiment of the Invention.
Figure 5D:
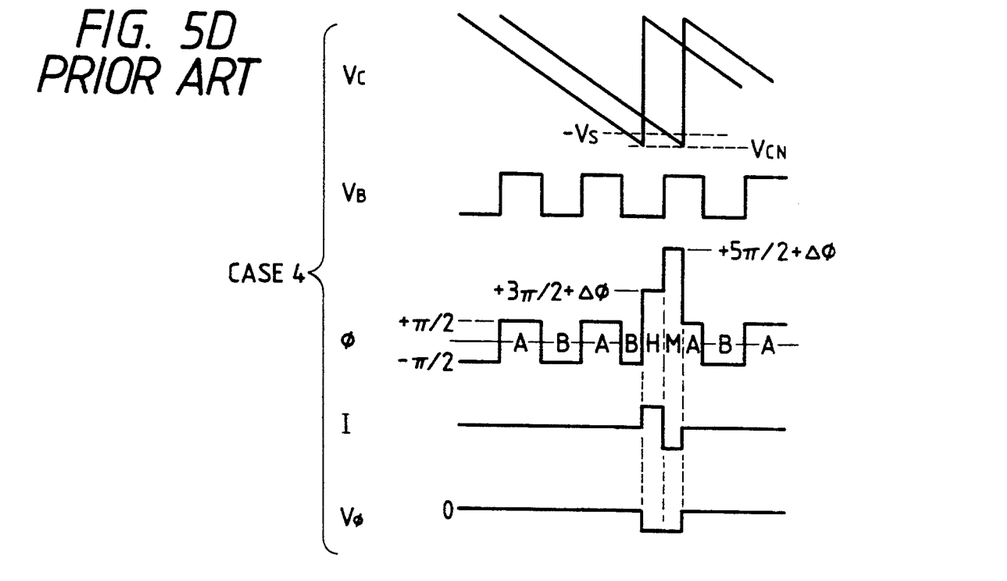
FIG. 5D is a diagram showing the phase cancel ramp signal, the biasing signal, the overall phase difference, the intensity of interference light and the synchronous detector output in Case 4 described later in Preferred Embodiment of the Invention.

Now, consider the case where the phase cancel ramp signal $V_C$ has a negative-going slope as shown in FIG. 5C and the conversion gain of the optical phase modulator 19 is smaller than the initialized value (Case 3). In this instance, in the state where the phase difference $\delta\Phi$ has been cancelled by the Sagnac phase shift amount $\Phi_R$, the phase difference $\Phi$ between the two light beams at the time of resetting is smaller in absolute value than $+(2m\pi 35\ \pi/2)$ rad by $\Delta\Phi$ Consequently, the intensity I of the interference light which is observed in the optoelectric transducer 16 is equal to the intensity at points F and K in FIG. 4 and the synchronous detector output V$\Phi$ is larger than those at points A and B as shown in FIG. 5C. Consider the case where the phase cancel ramp signal V$_C$ has a negative-going slope as shown in FIG. 5D and the conversion gain of the optical phase modulator 19 is larger than the initialized value (Case 4). In this instance, in the state where the phase difference $\delta\Phi$ has been cancelled by the Sagnac phase shift amount $\Phi_R$, the phase difference $\Phi$ between the two light beams at the time of resetting is larger in absolute value than $+(2m\pi \pm \pi/2)$ rad by $\Delta\Phi$. In consequence, the intensity I of the interference light which is observed in the optoelectric transducer 16 is equal to the intensity at points H and M in FIG. 4, and the synchronous detector output V$\Phi$ is smaller than those at points A and B as shown in FIG. 5D.

As described above, the shift setting voltages $\pm V_S$ necessary for providing the phase shifts $\pm 2m\pi$ fluctuate as the conversion gain of the optical phase modulator 19 varies. A conventional solution to this problem is to correct the positive and negative threshold voltages V$_{CP}$ and V$_{CN}$ by means of a threshold correcting circuit 31 shown in FIG. 6, as described below. The output V$\Phi$ of the synchronous detector 22 is also fed to first and second low-pass filters 32 and 33, the outputs of which are applied to inverting and non-inverting input terminals of a comparator 34, respectively. The cut-off frequency of the first low-pass filter 32 is set higher than the cut-off frequency of the second low-pass filter 33. An up-down counter 35 is controlled by the output of the comparator 34 to count up or down and counts the reset signal (pulses) R$_P$ from the reset signal generator 29. The count value of the up-down counter 35 is applied to a D/A converter 36, which provides a correcting value $\delta V$ in analog form. The second low-pass filter 33 outputs the mean level of the output of the synchronous detector 22, whereas the first low-pass filter 32 outputs the pulse of the synchronous detector output V$\Phi$ which is produced at the time of resetting, as depicted in FIGS. 5A to 5D. In Cases 1 and 4, that is, when the output pulse of the synchronous detector 22 at the time of resetting is negative, the output of the comparator 34 goes positive and the up-down counter 35 is put in the count-up state, increasing the correcting value $\delta V$. In Cases 2 and 3, that is, when the output pulse of the synchronous detector 22 at the time of resetting is positive, the output of the comparator 34 goes negative and the up-down counter 35 is altered to the count-down state, decreasing the correcting value $\delta V$.

Figure 6:
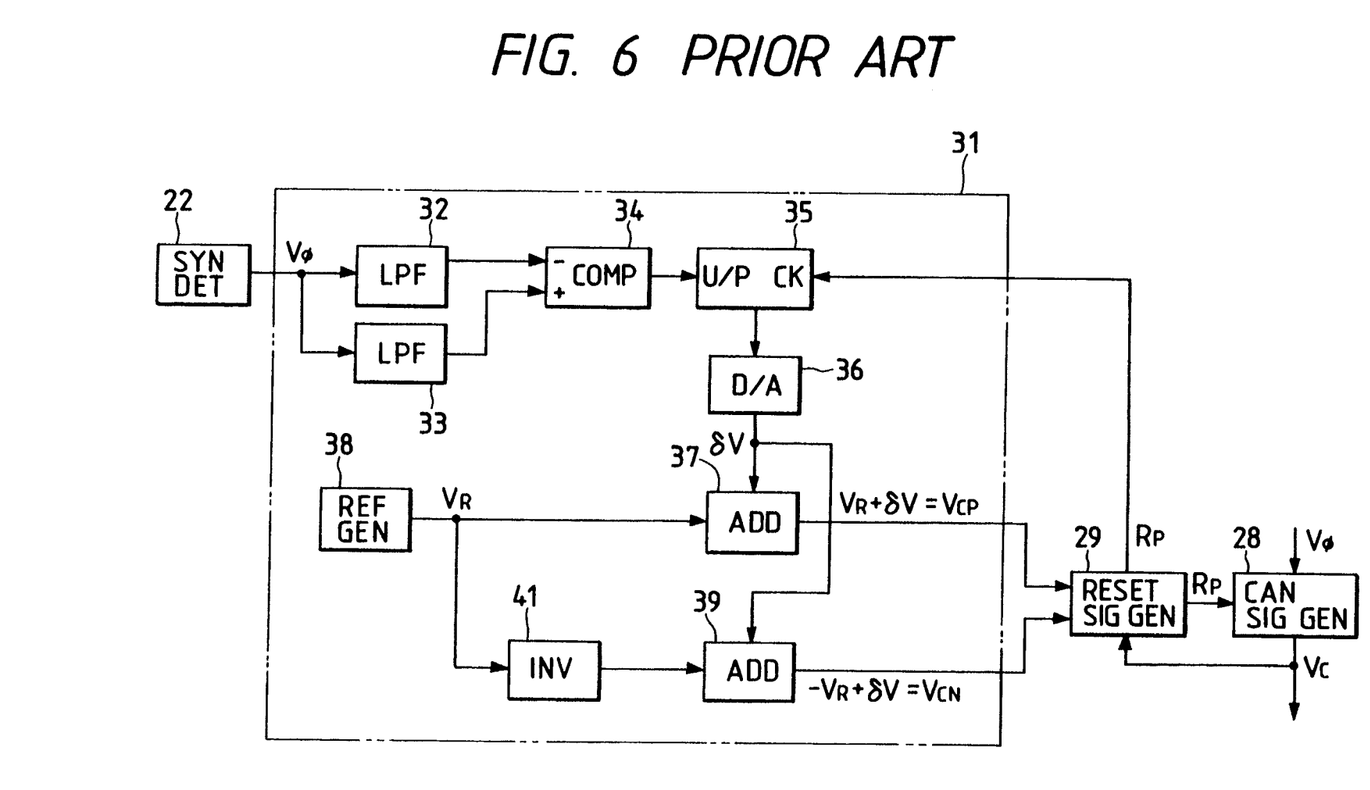
FIG. 6 is a block diagram showing a conventional threshold value correcting circuit 31.

The output $\Phi V$ of the D/A converter 36 is provided to an adder 37, wherein it is added to a reference level V$_R$ from a reference level generator 38, and the added output is applied as the positive threshold voltage V$_{CP}$ to the reset signal generator 29. Moreover, the output $\Phi V$ of the D/A converter 36 is also provided to an adder 39, wherein it is added to the output of an inverter 41 which has inverted the polarity of the reference level V$_R$ from the reference level generator 38, and the added output is provided as the negative threshold voltage V$_{CN}$. Thus, $$V_{CP} = V_R + \delta V \quad (6)$$

$$V_{CN} = -V_R + \delta V \quad (7)$$

When the output pulse of the synchronous detector 22 is negative at the time of resetting (Cases 1 and 4), the positive threshold voltage V$_{CP}$ increases and the absolute value of the negative threshold voltage V$_{CN}$ decreases. Conversely, when the output pulse of the synchronous detector 22 at the time of resetting is positive (Cases 2 and 3), the voltage V$_{CP}$ decreases and the absolute value of the voltage V$_{CN}$ increases.

In this way, when the direction of rotation of the input angular velocity is constant, the threshold voltage of the phase cancel ramp signal V$_C$ is corrected so that it corresponds to the shift setting voltage $\pm V_S$ at which the phase shift in the second phase modulator 19 is $\pm 2m\pi$ rad.

Figure 7:
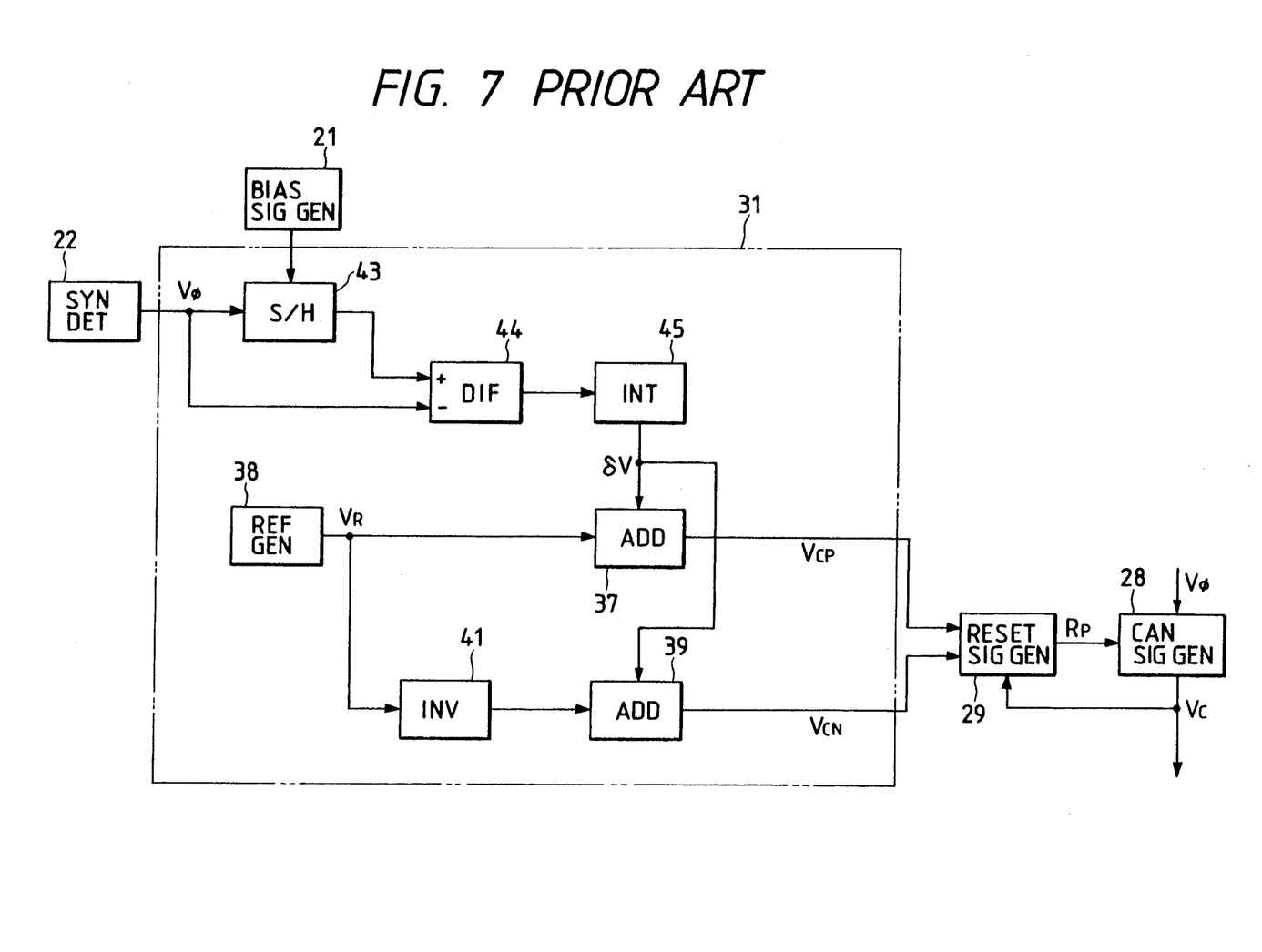
FIG. 7 is a block diagram showing another example of the conventional threshold value correcting circuit 31.

FIG. 7 shows another example of the threshold value correcting circuit 31. In this case, the output of the synchronous detector 22 is applied to a differential amplifier 44 as well as to a sample and hold circuit 43 which performs sampling immediately before the biasing signal V$_B$ is switched at $\tau$ time intervals. The differential amplifier 44 outputs, as an error signal, the difference between the output of the synchronous detector 22 in the current bias phase state ($+\pi/2$ or $-\pi/2$) and the output of the synchronous detector 22 in the preceding bias phase state. The error signal from the differential amplifier 44 is applied to an analog integrator 45 and its integrated output is provided as the correcting value $\delta V$. In this instance, when the output after resetting of the phase cancel ramp signal V$_C$ is smaller than the output prior to the resetting, the correcting value $\delta V$ is large, and when the output after the resetting is larger than that before resetting, the correcting value $\delta V$ is small.

The output correcting value $\delta V$ of the analog integrator 45 is provided to the adder 37, wherein it is added to the reference level V$_R$ from the reference level generator 38, and the added output is applied as the positive threshold value V$_{CP}$ to the reset signal generator 29. At the same time, the output correcting value $\delta V$ of the analog integrator 45 is also provided to the adder 39, wherein it is added to the output of the inverter 41 which has inverted the polarity of the reference level V$_R$ from the reference level generator 38, and the added output is provided as the negative threshold voltage V$_{CN}$. Thus, $$V_{CP} = V_R + \delta V \quad (6)$$

$$V_{CN} = -V_R + \delta V \quad (7)$$

When the synchronous detector output V$\Phi$ after resetting is smaller than the output before resetting (Cases 1 and 4), the correcting value $\delta V$ goes positive, and consequently, the absolute value of the voltage V$_{CP}$ increases and the absolute value of the voltage V$_{CN}$ decreases. Conversely, when the synchronous detector output $\delta V$ after resetting is larger than the output before resetting (Cases 2 and 3), the correcting value $\delta V$ goes negative, and consequently, the absolute value of the voltage V$_{CP}$ decreases and the absolute value of the voltage V$_{CN}$ increases.

In this way, when the direction of rotation of the input angular velocity is constant, the threshold voltage at which the phase cancel ramp signal is reset is corrected so that it coincides with the shift set voltage $\pm V_S$ corresponding to the phase shift amount $\pm 2m\pi$ rad in the optical phase modulator 19.

As described above, in the conventional linear phase ramp type fiber optic gyro the corrected threshold voltages are expressed by Eqs. (6) and (7), because the threshold value correcting circuit 31 has such a construction as shown in FIG. 6 or 7. For example, in the case where the slope of the phase cancel ramp signal $V_C$ is positive-going (the input angular velocity is clockwise), if the reference level $V_R$ has a deviation $\epsilon V$ from the shift setting voltage $+V_S$ corresponding to the phase difference $+2\pi m$ and therefore $V_R = V_S + \epsilon V$ (where $\epsilon V \geq 0$) such as Case 2 (FIG. 5B), then the synchronous detector 22 provides a positive output pulse at the time of resetting. Consequently, the correcting value $\delta V$ is controlled by the operation of the threshold value correcting circuit 31 to decrease, and when the correcting value $\delta V$ becomes equal to $-\epsilon V$, the negative feedback loop becomes stabilized and the threshold voltage $V_{CP}$ comes into agreement with the shift setting voltage $+V_S$. With the circuit constructions depicted in FIGS. 6 and 7, the negative threshold voltage $V_{CN}$ at this time is determined by Eq. (7), hence $$V_{CN} = -V_R + \delta V \qquad (8)$$
$$= -V_R - \epsilon V$$

However, since it has been assumed that $V_R = V_S + \epsilon V$, its substitution into Eq. (8) gives $V_{CN} = -V_S - 2\epsilon V$, which means that the threshold voltage $V_{CN}$ has a deviation of $-2\epsilon V$ from the shift set voltage $-V_S$ corresponding to the phase difference $-2m\pi$. If the direction of rotation of the input angular velocity is reversed in such a state, the deviation of the threshold voltage $V_{CN}$ from the shift set voltage $V_S$ is as large as $-2\epsilon V$ immediately after the reversal of the direction, and hence a measurement error of the input angular velocity is large.

Similarly, when the reference level $V_R$ has the same deviation $\epsilon V$ as in the above case and the slope of the phase cancel ramp signal $V_C$ is negative (the input angular velocity counterclockwise) (Case 4), the negative feedback loop becomes stabilized when $\delta V$ becomes equal to $+\epsilon V$ and the negative threshold voltage $V_{CN}$ becomes equal to $-V_S$, but at this time, the positive threshold voltage $V_{CP}$ obtained from the circuits of FIGS. 6 and 7 becomes $V_{CP} = V_S + 2\epsilon V$ and it has the deviation $2\epsilon V$ from the shift set voltage $+V_S$. Accordingly, if the direction of rotation of the input angular velocity is reversed in such a state, a large error is caused in the measurement of the angular velocity in the transition period of the negative feedback operation after the reversal of the direction.

To sum up, when the conversion gain of the optical phase modulator 19 is in its steady state, if the direction of rotation of the input angular velocity is reversed and the slope of the phase cancel ramp signal is also reversed, then it is necessary for the correcting value $\delta V$ to undergo a substantial change from $+\epsilon V$ to $-\epsilon V$ or vice versa, resulting in in accurate measurement of the input angular velocity in the transition period.

SUMMARY OF THE INVENTION

It is therefore an object of the present invention to provide a linear phase ramp type fiber optic gyro which has a threshold value correcting circuit by which deviations of the threshold voltages $V_{CP}$ and $V_{CN}$ newly corrected relative to the shift setting voltage $\pm V_S$ corresponding to the phase difference of $\pm 2m\pi$ rad (m is a positive integer) can be maintained substantially zero even immediately after the direction of rotation of an inputted angular velocity is reversed.

According to an aspect of the present invention, when a phase cancel ramp signal has reached a predetermined positive or negative threshold voltage ($V_{CP}$ or $V_{CN}$), a reset signal generator not only generates a reset signal for resetting the phase cancel ramp signal but also generates a reset sign signal representing that the reset of the phase cancel ramp signal has been effected by which of the positive or negative threshold voltages ($V_{CP}$ or $V_{CN}$) the phase cancel ramp signal has reached. Depending upon the reset sign signal and the polarity of a pulse which is produced by a synchronous detector at the time of resetting, an up-down counter for counting the reset signal is controlled to count up or down, and the count value of the counter is converted to an analog signal to obtain the correcting value $\delta V$, which is used to correct the positive and negative threshold voltages $V_{CP}$ and $V_{CN}$ so that their absolute values both increase or decrease at the same time. In this way, the input angular velocity can be measured accurately even in the transition period in which the slope of the phase cancel ramp signal is reversed (i.e. the direction of rotation of the inputted angular velocity is reversed).

According to another aspect of the present invention, when a phase cancel ramp signal has reached a predetermined positive or negative threshold voltage ($V_{CP}$ or $V_{CN}$), a reset signal generator not only generates a reset signal for resetting the phase cancel ramp signal but also generates a reset sign signal representing that the reset of the phase cancel ramp signal has been effected by which of the positive or negative threshold voltages ($V_{CP}$ or $V_{CN}$) the phase cancel ramp signal has reached. A signal value having a sign corresponding to the reset sign signal is multiplied by an error signal to obtain a threshold value correcting signal, which is used to correct the positive and negative threshold voltages $V_{CP}$ and $V_{CN}$ so that their absolute values both increase or decrease at the same time. Thus, the input angular velocity can be measured accurately even in the transition period in which the slope of the phase cancel ramp signal is reversed (i.e. the direction of rotation of the inputted angular velocity is reversed).

PREFERRED EMBODIMENT OF THE PRESENT INVENTION

Figure 8:
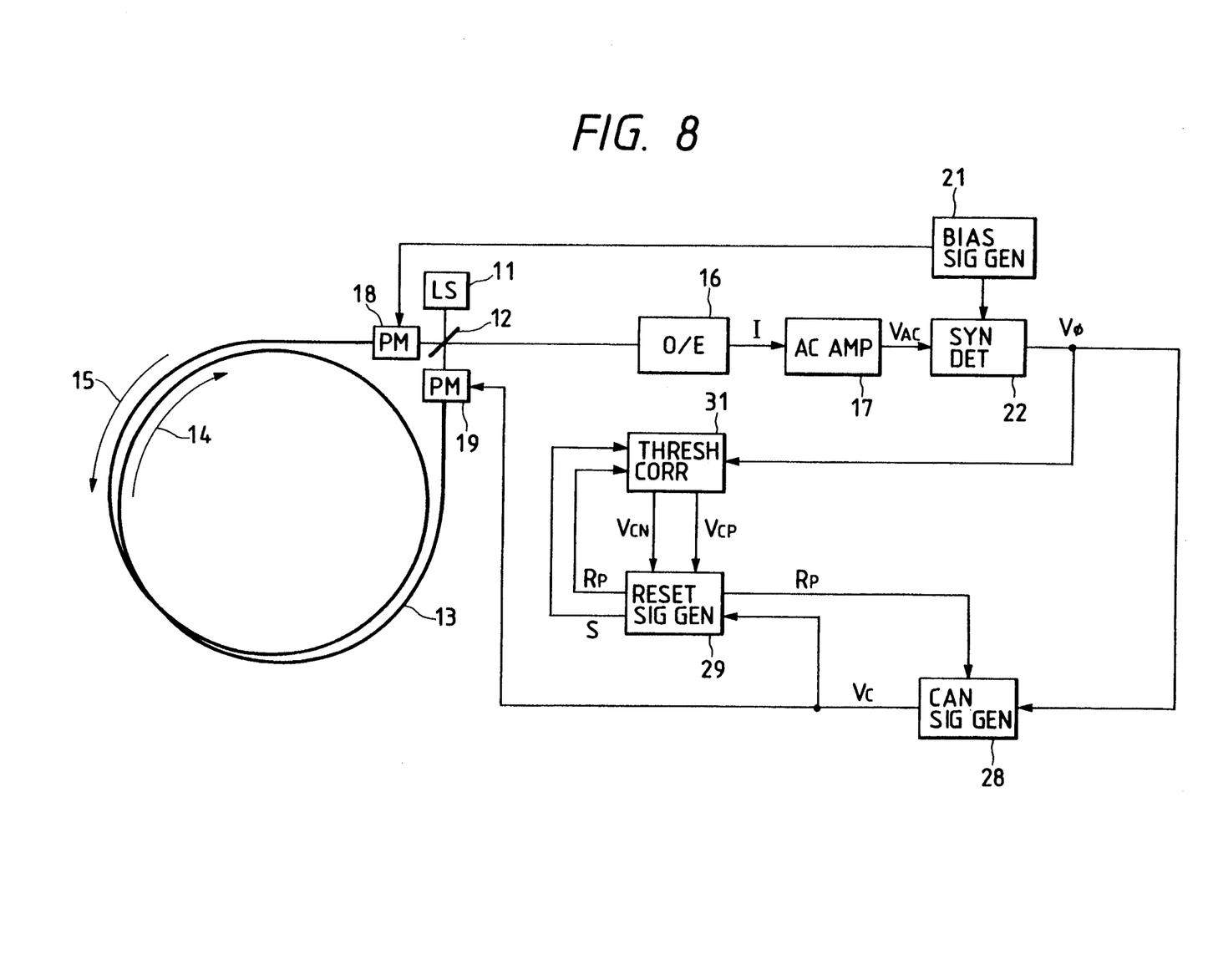
FIG. 8 is a block diagram illustrating an embodiment of the present invention.
Figure 9:
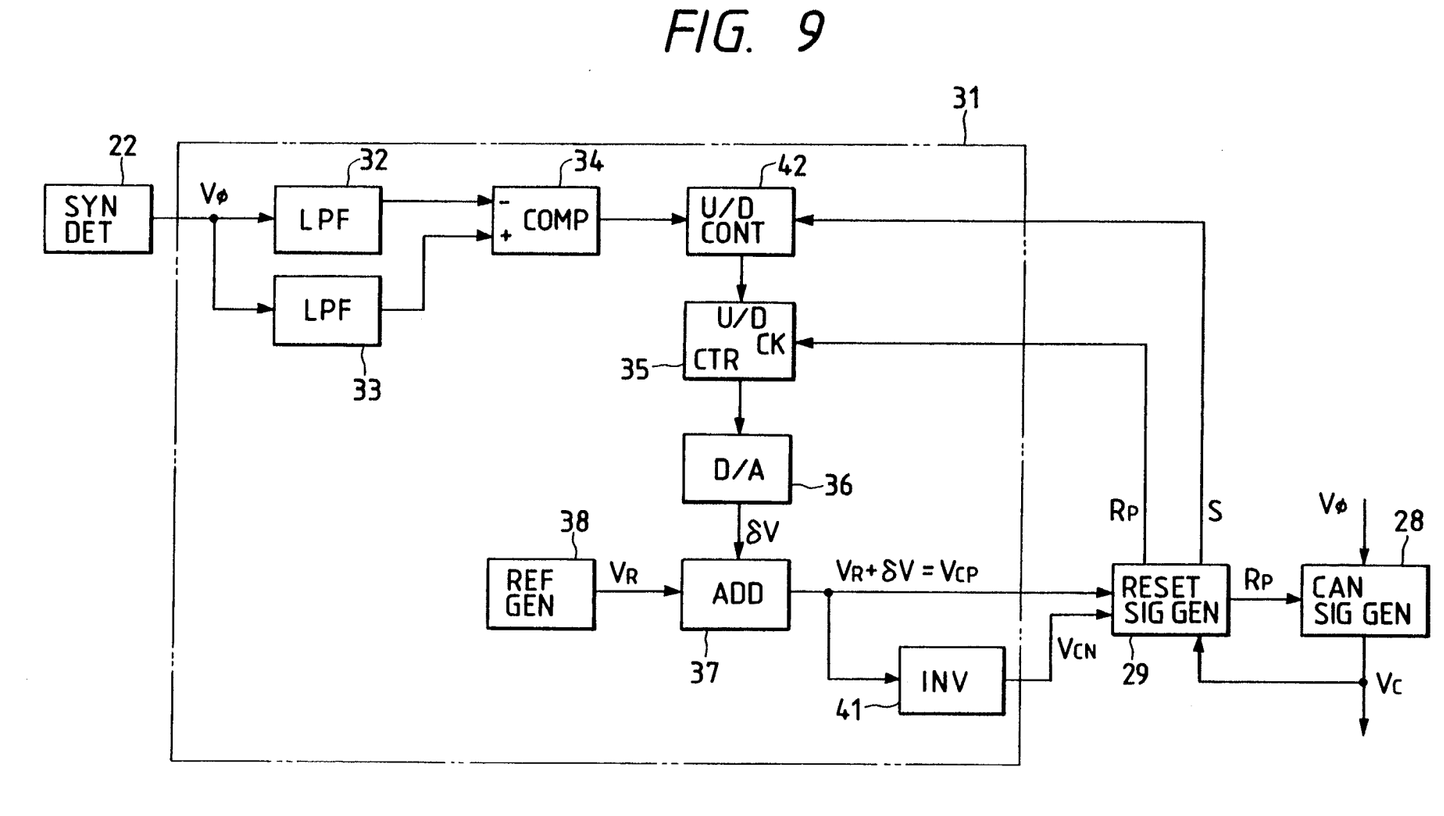
FIG. 9 is a block diagram illustrating a specific operative example of the threshold value correcting circuit 31 in FIG. 8.

FIG. 8 illustrates in block form a first embodiment of the present invention, in which the parts corresponding to those in FIG. 1 are identified by the same reference numerals. FIG. 9 illustrates a specific operative example of the threshold value correcting circuit 31 which forms the principal part of the invention, the parts corresponding to those in FIG. 6 being identified by the same reference numerals.

The output of the optoelectric transducer 16 such as a photodiode is amplified by the AC amplifier 17, the output of which is applied to the balanced demodulation type synchronous detector 22, wherein it is multiplied by $+1$ when the phase difference thereof is $+\pi/2$ rad and by $-1$ when the phase difference thereof is $-\pi/2$ rad in synchronism with the biasing signal $V_B$. The phase cancel signal generator 28 creates, by integrating the detected output $V\Phi$ of the synchronous detector 22, the phase cancel ramp signal $V_C$ to such a slope as to cancel the phase difference $\Phi_R$ which is caused between the clockwise and counterclockwise light beams by the Sagnac effect in accordance with the direction and magnitude of the input angular velocity. The voltage of the phase cancel ramp signal $V_C$ is reset to zero upon each application of the reset signal $R_P$ from the reset signal generator 29 to the phase cancel signal generator 28. The sawtooth phase cancel ramp signal $V_C$ thus produced is applied to the second optical phase modulator 19.

Figure 10:
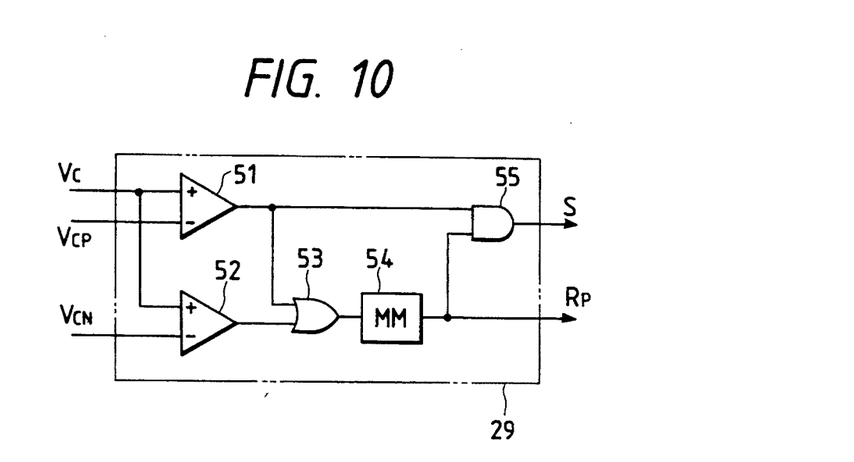
FIG. 10 is a circuit diagram illustrating an example of the construction of a reset signal generator 29 in FIG. 9.

The biasing signal $V_B$ outputted from the biasing signal generator 21, which corresponds to the phase shift $\pm\pi/2$ rad, is inputted to the first optical phase modulator 18. When a given phase cancel ramp signal $V_C$ applied to the reset signal generator reaches the threshold voltage $V_{CP}$ or $V_{CN}$ equal to the shift setting voltage $V_S$ corresponding to a predetermined phase difference $\pm 2m\pi E$ ($m=1, 2, 3, \ldots$), the reset signal generator 29 generates the reset signal $R_P$ to thereby reset the phase cancel signal generator 28 and, at the same time, provides a reset sign signal S which represents, by H or L logic, whether the threshold voltage the phase cancel ramp signal Vc has reached, whereby the reset signal $R_P$ has been generated, is the positive threshold voltage Vcp or the negative threshold voltage Vcn Such a reset signal generator 29 can easily be obtained by modifying a reset signal generator disclosed in the aforementioned U.S. patent. FIG. 10 shows is an example.

As shown in FIG. 10, the reset signal generator 29 can be formed by two comparators 51 and 52 for comparing the phase cancel ramp signal $V_C$ with the positive and negative threshold voltages $V_{CP}$ and $V_{CN}$, respectively, an OR gate 53 for ORing the compared outputs, a monostable multivibrator 54 which is triggered by the output of the OR gate 53 to generate the reset pulse $R_P$, and an AND gate 55 which outputs, as the reset sign signal S, the AND of the output of the one comparator, 51 in this example, with the output of the monostable multivibrator 54. Accordingly, in this example, the reset sign signal S of H logic is outputted when the reset signal Rp has been generated as a result of the phase cancel ramp signal Vc having reached the positive threshold voltage Vcp and the reset sign signal S of L logic is outputted when the reset signal Rp has been generated as a result of the phase cancel ramp signal Vc having reached the positive threshold voltage $V_{CP}$ and the reset sign signal S of L logic when the reset signal $R_P$ is generated corresponding to the negative threshold voltage $V_{CN}$.

The output $V\Phi$ of the synchronous detector 22 is also applied to the first and second low-pass filters 32 and 33, the outputs of which are fed to inverting and non-inverting input terminals of the comparator 34, respectively. The cut-off frequency of the first low-pass filter 32 is set higher than the cut-off frequency of the second low-pass filter 33. The output of the comparator 34 is provided to an up-down control circuit 42. The reset sign signal S from the reset signal generator 29 is also applied to the up-down control circuit 42. The up-down control circuit 42 multiplies the output of the comparator 34 by $+1$ or $-1$, depending on whether the logic represented by the reset sign signal S is high or low. Based on the polarity of the output from the up-down control circuit 42, the up-down counter 35 is put in the count-up or count-down state and counts the reset signal (pulses) $R_P$ from the reset signal generator 29. The count value of the up-down counter 35 is fed to the D/A converter 36 and is thereby converted to the correcting value $\delta V$ in analog form. When the output pulse of the synchronous detector 22 at the time of resetting is negative, the output of the comparator 34 goes positive and when the output pulse of the synchronous detector 22 is positive, the output of the comparator 34 goes negative.

The example of FIG. 10 is adapted so that when the phase cancel ramp signal $V_C$ has reached the positive threshold voltage $V_{CP}$ and is then reset, the reset sign signal S goes high (H logic) (this reset being referred to as positive reset hereinafter), and when the signal $V_C$ has been reset after having reached the negative threshold voltage $V_{CN}$, the reset sign signal S goes low (L logic) (this reset being referred to as negative reset hereinafter). Consequently, in Cases 1 and 3 shown in FIGS. 5A and 5C the products of the output of the comparator 34 and the values $+1$ and $-1$ represented by the logic H and L of the reset sign signal S two go positive and the up-down counter 35 enters the count-up state, hence the correcting value δV increases. In Cases 2 and 4 shown in FIGS. 5B and 5D the products of the output of the comparator 34 and the values +1 and −1 both go negative and the up-down counter 35 enters the count-down state, hence the correcting value δV decreases. The first and second low-pass filters 32 and 33 and the comparator 34 constitute means for detecting the polarity of the output pulse of the synchronous detector 22 at the time of resetting. The output δV of the D/A converter 36 is added to the reference level $V_R$ from the reference level generator 38 in the adder 37 and the added output is applied as the positive threshold voltage $V_{CP}$ to the reset signal generator 29. A polarity inverted version of the voltage $V_{CP}$, by the inverter 41, is provided as the negative threshold voltage $V_{CN}$. Thus, $$V_{CP} = V_R + \delta V \qquad (9)$$

$$V_{CN} = -(V_R + \delta V) \qquad (10)$$

When the output pulse of the synchronous detector 22 is negative in the case of the positive reset (Case 1), or when the output pulse of the synchronous detector 22 is positive in the case of the negative reset (Case 3), the absolute values of the voltages $V_{CP}$ and $V_{CN}$ become large. Conversely, when the output pulse of the synchronous detector 22 is positive in the case of the positive reset (Case 2), or when the output pulse of the synchronous detector 22 is negative in the case of the negative reset (Case 4), the absolute values of the voltages $V_{CP}$ and $V_{CN}$ become small. In the case where the reference level $V_R$ has a deviation $\epsilon V$ ($V_R = V_S + \epsilon V$) relative to the shift setting voltage $\pm V_S$ corresponding to the phase difference $\pm 2\pi m$ rad, the correcting value δV always becomes $-\epsilon V$. Consequently, even in the transition period after the direction of rotation of the input angular velocity was reversed and then the slope of the phase cancel ramp signal was also reversed, the correcting value δV does not undergo such variations as in the prior art, hence the input angular velocity can accurately be measured.

The up-down control circuit 42 is not limited specifically to the multiplier but may also be formed by an exclusive OR circuit, which is supplied with the H or L logic of the reset sign signal S and controls the counter 35 to enter the count-up mode and the count-down mode by an output "0" and an output "1" respectively.

Figure 11:
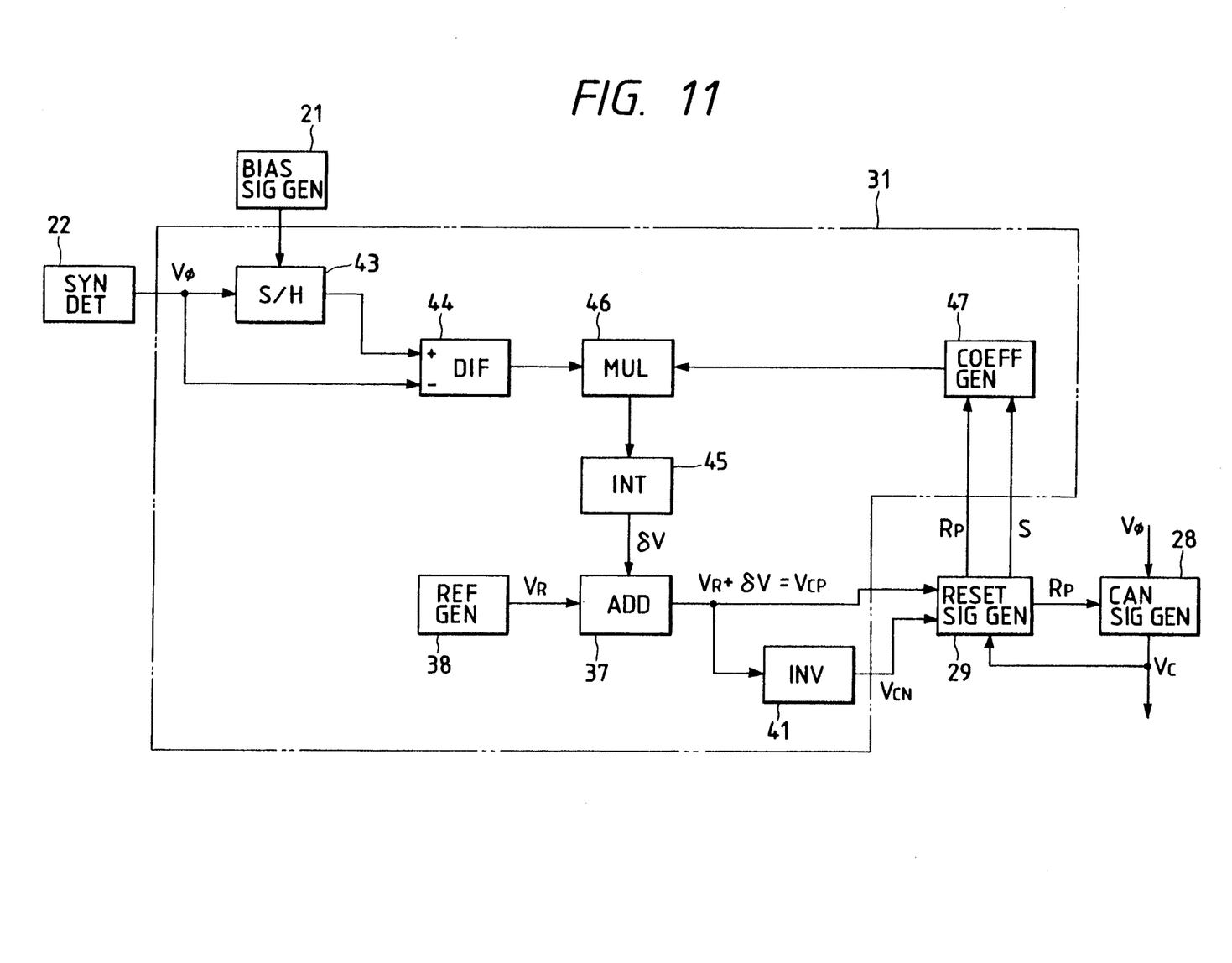
FIG. 11 is a block diagram illustrating another example of the threshold value correcting circuit 31.

FIG. 11 illustrates the principal part of a second embodiment of the present invention, in which the parts corresponding to those in FIG. 7 are identified by the same reference numerals. As is the case with the FIG. 7 embodiment, the output $V\Phi$ of the synchronous detector 22 is applied to the differential amplifier 44 and the sample and hold circuit 43 which performs sampling immediately prior to the switching of the biasing signal $V_B$ at $\tau$ time intervals. The differential amplifier 44 outputs, as an error signal, the difference between the output of the synchronous detector 22 in the bias state at that time and the output of the synchronous detector 22 in the immediately previous bias state ($+\pi/2$ or $-\pi/2$), and the output of the differential amplifier 44 is applied to a multiplier 46. Based on the reset signal $R_P$ and the reset sign signal S from the reset signal generator 29, a coefficient generator 47 outputs a coefficient "0" when no reset has occurred, a coefficient "+1" in the case of the positive reset, that is, when the phase cancel ramp signal $V_C$ has reached the positive threshold voltage $V_{CP}$ and the positive reset has been caused, and a coefficient "−1" in the case of the negative reset, that is, when the phase cancel ramp signal $V_C$ has reached the negative threshold voltage $V_{CN}$ and the negative reset has been caused. The output of the coefficient generator 47 is provided to the multiplier 46. The multiplier 46 multiplies the two input signals and outputs the multiplied output.

The output of the multiplier 46 is integrated by an analog integrator 45, the integrated output of which is provided as the correcting value δV to the adder 37. When the positive reset is caused and the synchronous detector output $V\Phi$ after the reset is smaller than that prior to the reset (Case 1), or when the negative reset is caused and the synchronous detector output $V\Phi$ after the reset is larger than that prior to the reset (Case 3), the correcting value δV increases. When the positive reset is caused and the synchronous detector output $V\Phi$ after the reset is larger than that before the reset (Case 2), or when the negative reset is caused and the synchronous detector output $V\Phi$ after the reset is smaller than that before the reset (Case 4), the correcting value δ decreases.

The correcting value δV output from the analog integrator 45 is added by the adder 37 to the reference level $V_R$ from the reference level generator 38, and the added output ($V_R \delta V$) is applied as the newly corrected positive threshold voltage $V_{CP}$ to the reset signal generator 29. Also, the newly corrected threshold voltage Vcp is inverted in polarity by the inverter 41 and is provided as the newly corrected negative threshold voltage $V_{CN}$ to the reset signal generator 29. Thus, the equations (9) and (10) are also satisfied in the second embodiment of the present invention.

When the positive reset is caused and the synchronous detector output $V\Phi$ after the reset is smaller than that before the reset (Case 1), or when the negative reset is caused and the synchronous detector output $V\Phi$ after the reset is larger than that before the reset (Case 3), the absolute values of the voltages $V_{CP}$ and $V_{CN}$ both become large. Conversely, when the positive reset is caused and the synchronous detector output $V\Phi$ after the reset is larger than that before the reset (Case 2), or when the negative reset is caused and the synchronous detector output $V\Phi$ after the reset is smaller than that before the reset (Case 4), the absolute values of the voltages $V_{CP}$ and $V_{CN}$ two become small. In the case where the reference level $V_R$ has a deviation $\epsilon V$ relative to the shift setting voltage $\pm V_S$ corresponding to the phase difference $\pm 2m$ rad ($V_R = V_S + \epsilon V$), the correcting value δV always becomes $-\epsilon V$. Hence, even in the transition period after the direction of rotation of the input angular velocity was reversed and the slope of the phase cancel ramp signal was reversed, the correcting value δV does not undergo such a variation as in the prior art, and consequently, the input angular velocity can be measured accurately.

As described above, according to the first embodiment of the present invention, the reset sign signal S is provided which represents that the reset of the phase cancel signal generator 28 has been effected by which of the positive and negative threshold voltages (Vcp or Vcn) the sawtooth phase cancel ramp signal Vc has reached. Depending upon this reset sign signal S and whether the output $V\Phi$ the synchronous detector 22 at the time of reset of the phase cancel signal generator 28 is a positive or negative pulse, the up-down counter 35 is switched to count up and down and the correcting value δV is used to correct the threshold voltages $V_{CP}$ and $V_{CN}$ so that their absolute values two increase or decrease at the same time. By this, the input angular velocity can be accurately measured even in the transition period immediately after the input angular velocity was reversed and the slope of the phase cancel ramp signal was also reversed.

According to the second embodiment of the present invention, the reset sign signal S is provided which represents that the reset of the phase cancel signal generator 28 has been effected by which of the positive and negative threshold voltages (Vcp or Vcn) the sawtooth phase cancel ramp signal $V_C$ has reached. The reset sign signal S is multiplied by an error signal between the outputs of the synchronous detector 22 before and after the reset of the phases cancel signal operator 28, and the multiplied output is integrated. The integrated value is added as a correcting value to the one threshold voltage $V_{CP}$ to correct it, and the newly corrected threshold voltage Vcp s inverted in polarity and this corrected threshold voltage of inverted polarity is output as the other newly corrected threshold voltage $V_{CN}$. By this, the input angular velocity can accurately be measured even in the transition period immediately after the direction of rotation of the input angular velocity was reversed and the slope of the phase cancel ramp signal was also reversed.

It will be apparent that many modifications and variations may be effected without departing from the scope of the novel concepts of the present invention.

What is claimed is:

1. A linear phase ramp type fiber optic gyro comprising:
    a light source;
    a beam splitter for splitting a light beam from said light source into two light beams;
    a looped optical transmission line into which said two light beams from said beam splitter are introduced as clockwise and counterclockwise light beams;
    interference means for causing said clockwise and counterclockwise light beams emitted from said optical transmission line to interfere with each other;
    photoelectric transducer means responsive to interference light from said interference means for outputting an electric signal corresponding to the intensity of said interference light;
    first and second optical phase modulators interposed respectively between opposite ends of said optical transmission line and said beam splitter, said first and second optical phase modulators being electrically controlled to shift the phase of light;
    a biasing signal generator for generating a biasing signal in the form of a rectangular waveform having a period that is two times as long as the light propagation time $\tau$ through said optical transmission line and a 50% duty ratio, said biasing signal being applied to said first optical phase modulator for alternately producing phase differences of $+\pi/2$ rad and $-\pi/2$ rad at intervals of the time $\tau$ between said clockwise and counterclockwise light beams in said interference means;
    an AC amplifier for amplifying the AC component of the output of said photoelectric transducer means;
    synchronous detector means for synchronously detecting the output of said AC amplifier in accordance with said biasing signal;
    phase cancel signal generating means for generating, based on the output of said synchronous detector means, a sawtooth phase cancel ramp signal having a slope which cancels a Sagnac phase differences between said clockwise and counterclockwise light beams produced by an angular velocity inputted to said optical transmission line, said phase cancel ramp signal being applied to said second optical phase modulator;
    reset signal generating means for generating a reset signal which resets said phase cancel ramp signal at the time when said phase cancel ramp signal has reached a predetermined positive or negative threshold voltage, said reset signal generating means also generating a reset sign signal that represents whether said phase cancel ramp signal has reached said positive threshold voltage or said negative threshold voltage at that time;
    means for detecting the polarity of a pulse which is output from said synchronous detector means at the time when said phase cancel ramp signal is reset;
    up-down control means for outputting a count-up or count-down command depending upon the detected polarity of said pulse and said reset sign signal;
    an up-down counter responsive to said command for counting said reset signal up or down;
    a D/A converter for converting the count value of said up-down counter to an analog signal and for outputting said analog signal as a correcting value; and
    correcting means for correcting said positive and negative threshold voltages based on said correcting value so that the absolute values thereof two increase or decrease at the same time.

2. The fiber optic gyro of claim 1 wherein said pulse polarity detecting means includes:
    a first low-pass filter of a high cut-off frequency supplied with the detected output of said synchronous detector means for permitting a pulse in the detected output to pass through said first filter;
    a second low-pass filter of a low cut-off frequency supplied with a detected output of said synchronous detector means for outputting the mean level of the detected output; and
    comparison means for comparing the outputs of said first and second low-pass filters and outputting the compared result as the polarity of the detected pulse.

3. A linear phase ramp type fiber optic gyro comprising:
    a light source;
    a beam splitter for splitting a light beam from said light source into two light beams;
    a looped optical transmission line into which said two light beams from said beam splitter are introduced as clockwise and counterclockwise light beams;
    interference means for causing said clockwise and counterclockwise light beams emitted from said optical transmission line to interfere with each other;
    photoelectric transducer means responsive to interference light from said interference means for outputting an electric signal corresponding to the intensity of said interference light;

first and second optical phase modulators interposed respectively between opposite ends of said optical transmission line and said beam splitter, said first and second optical phase modulators being electrically controlled to shift the phase of light;

a biasing signal generator for generating a biasing signal in the form of a rectangular waveform having a period that is two times as long as the light propagation time $\tau$ through said optical transmission line and a 50% duty ratio, said biasing signal being applied to said first optical phase modulator for alternately producing phase differences of $+\pi/2$ rad and $-\pi/2$ rad at intervals of the time $\tau$ between said clockwise and counterclockwise light beams in said interference means;

an AC amplifier for amplifying the AC component of the output of said photoelectric transducer means;

synchronous detector means for synchronously detecting the output of said AC amplifier in accordance with said biasing signal;

phase cancel signal generating means for generating, based on the output of said synchronous detector means, a sawtooth phase cancel ramp signal having a slope which cancels a Sagnac phase differences between said clockwise and counterclockwise light beams produced by an angular velocity inputted into said optical transmission line, said phase cancel ramp signal being applied to said second optical phase modulator;

reset signal generating means for generating a reset signal which resets said phase cancel ramp signal at the time when said phase cancel ramp signal has reached a predetermined positive or negative threshold voltage, said reset signal generating means also generating a reset sign signal that represents whether said phase cancel ramp signal has reached said positive threshold voltage or said negative threshold voltage at that time;

error signal detecting means for detecting, as an error signal, a difference in level between the outputs of said synchronous detector before and after said biasing signal switches at intervals of the time $\tau$;

correct signal generating means for multiplying said error signal by a signal value whose sign corresponds to said reset sign signal to output a correcting value when said reset signal has been output; and correcting means for correcting said positive and negative threshold voltages based on said correcting value so that the absolute values thereof two increase or decrease at the same time.

4. The fiber optic gyro of claim 3 wherein said error signal detecting means includes:

sample and hold means for sampling and holding the output of said synchronous detector means in synchronism with said biasing signal at intervals of the time $\tau$; and differential amplifier means for outputting, as said error signal, a difference in level between the output of said synchronous detector means during the current time interval $\tau$ synchronized with said biasing signal and the output of said synchronous detector means during the immediately preceding time interval $\tau$ held by said sample and hold means.

5. The fiber optic gyro of claims 1, 2, 3, or 4 wherein said correcting means includes:

means for generating a reference level;

adder means for adding said reference level and said correcting value to provide a result that is one of said positive and negative threshold voltages; and means for inverting the polarity of the output of said adder means to provide a polarity inverted output that is the other of said positive and negative threshold voltages.

* * * * *